April 29, 1930.   I. C. JENNINGS   1,756,645
EXTERNAL SUPPORT FOR BEARINGS OF MOTOR DRIVEN PUMPS
Filed May 3, 1926   3 Sheets-Sheet 1
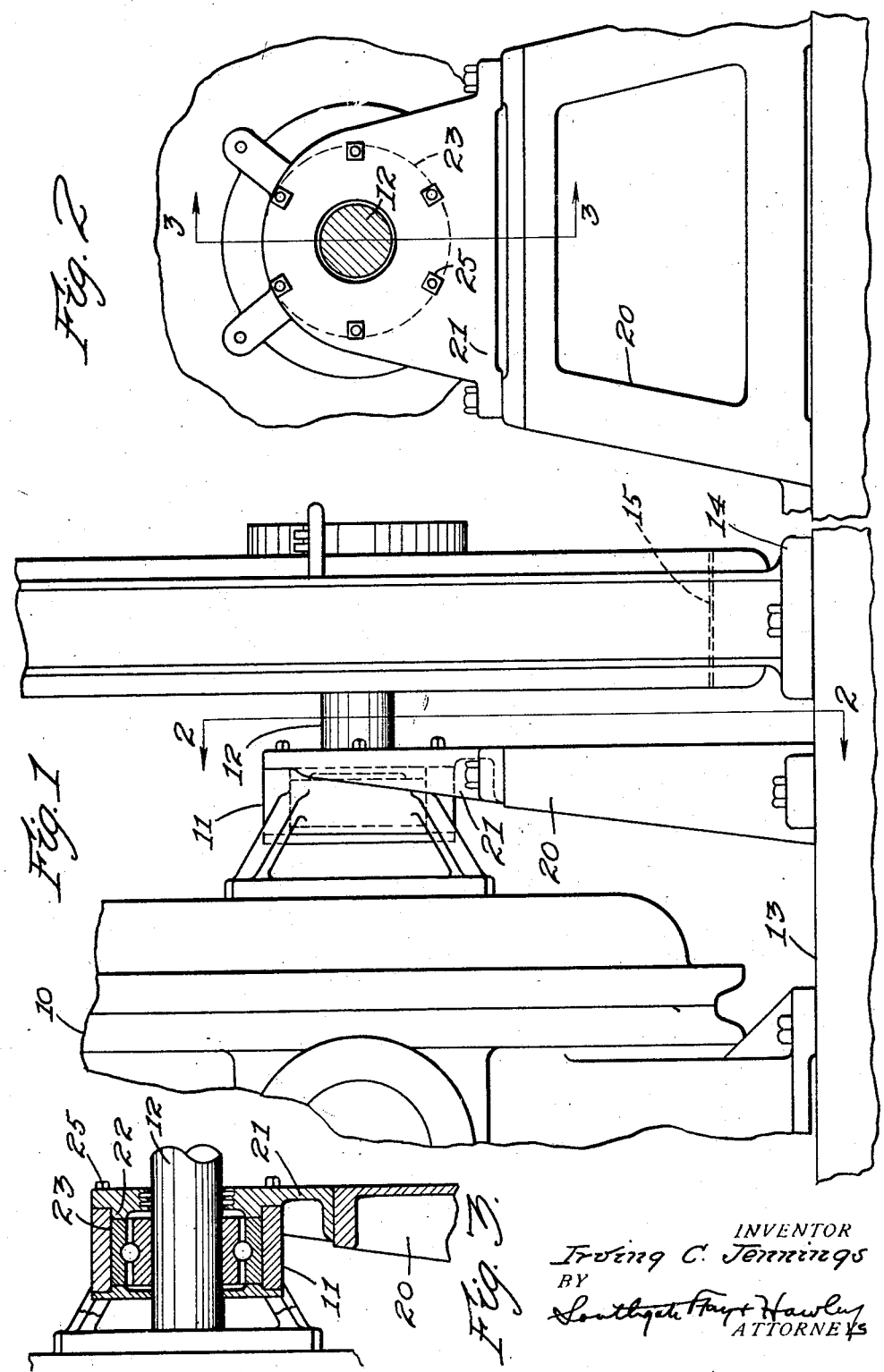

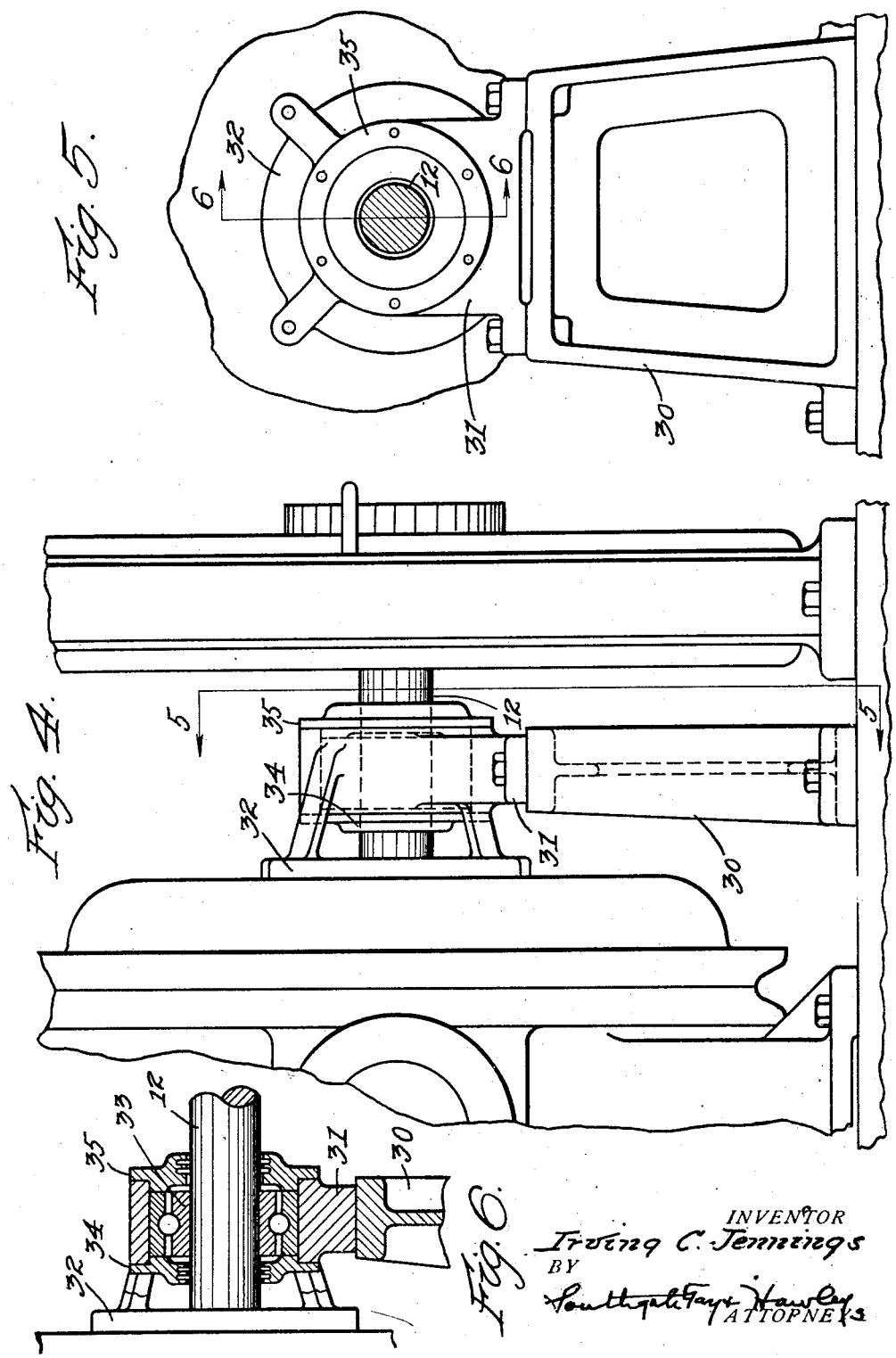

April 29, 1930.  I. C. JENNINGS  1,756,645
EXTERNAL SUPPORT FOR BEARINGS OF MOTOR DRIVEN PUMPS
Filed May 3, 1926  3 Sheets-Sheet 3
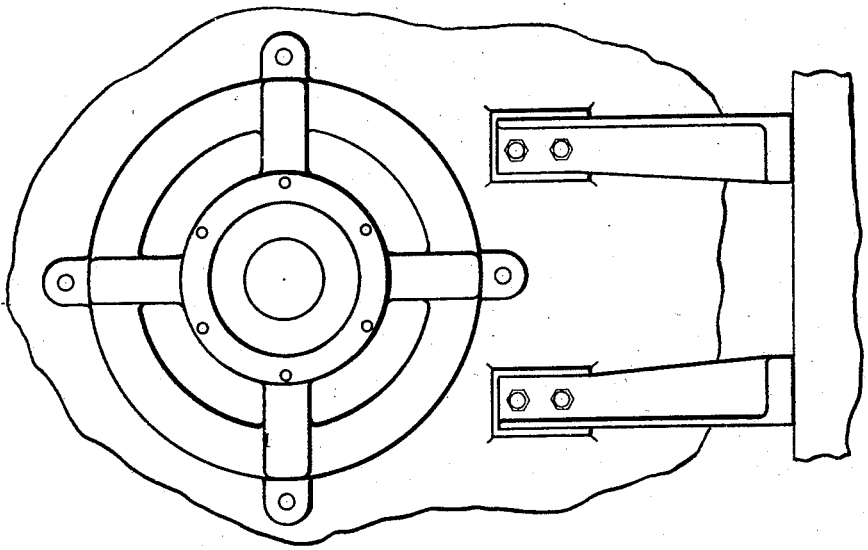
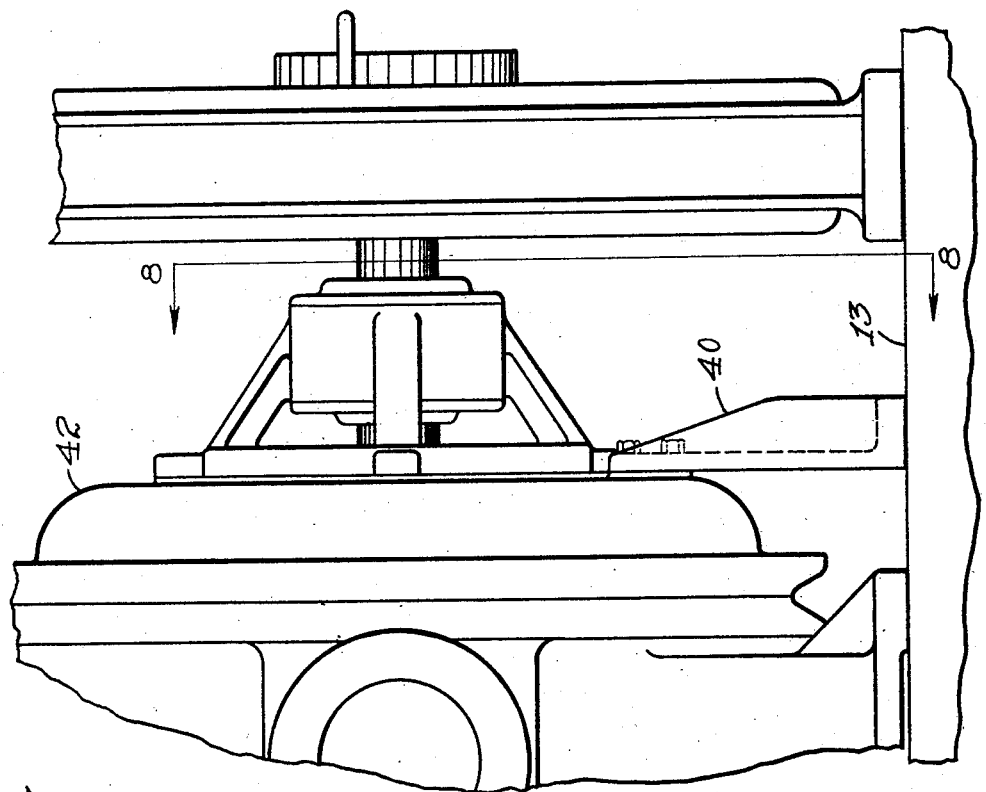
INVENTOR
Irving C. Jennings.
BY
ATTORNEYS Patented Apr. 29, 1930

1,756,645

UNITED STATES PATENT OFFICE

IRVING C. JENNINGS, OF SOUTH NORWALK, CONNECTICUT

EXTERNAL SUPPORT FOR BEARINGS OF MOTOR-DRIVEN PUMPS

Application filed May 3, 1926. Serial No. 106,425.

This invention relates to an external support for one of the bearings of the main shaft of a motor driven rotary pump.

It has become the accepted practice to drive large rotary pumps by mounting the rotor of a synchronous or polyphase motor directly upon the outwardly projected end of the pump shaft. The stationary part of the motor is preferably mounted on a rigid base which also supports the pump.

The clearance or air gap between the revolving and stationary parts of the motor is very slight, commonly not over $\frac{1}{16}$ of an inch in a large motor in which the rotor may be 40 inches or more in diameter and may weigh as much as 4000 pounds. When such a rotor is very slightly displaced radially in the motor frame, the radial magnetic pull on the rotor is greatly increased and may even exceed the weight of the rotor.

It is therefore very important that the rotor be kept accurately centered in the motor frame, a condition which is difficult to attain in the unbalanced construction above described.

It is the object of my invention to provide an external support for the pump shaft bearing which is nearer the unbalanced weight of the rotor, with the intention that the rotor shall be firmly held thereby from radial displacement, either by its own weight or by the magnetic pull thereon.

Three forms of the invention are shown in the drawings in which

Fig. 1 is a partial front elevation of a motor-driven rotary air pump;

Fig. 2 is a sectional end view, taken along the line 2—2 in Fig. 1;

Fig. 3 is a detail sectional elevation, taken along the line 3—3 in Fig. 2;

Fig. 4 is a partial front elevation of a modified construction;

Fig. 5 is a sectional end elevation, taken along the line 5—5 in Fig. 4;

Fig. 6 is a detail sectional view, taken along the line 6—6 in Fig. 5;

Fig. 7 is a partial front elevation of a further modification; and

Fig. 8 is a sectional end elevation taken along the line 8—8 in Fig. 7.

Referring to Figs. 1 to 3, I have indicated part of a rotary air pump 10 having bearings 11 for the main pump shaft 12. Only one of the bearings 11 is shown in the drawings, but it will be understood that a similar bearing is provided at the opposite side of the casing 10.

The pump casing 10 is rigidly secured to a heavy base 13 upon which a motor casing 14 is also mounted. The rotor 15 of the motor 14 is mounted on an outwardly projected end of the shaft 12 and rotates within the motor casing 14. The motor, as indicated in the drawings, may be of the synchronous or polyphase type or may be of any other suitable type in which the rotor is very heavy and the clearance is very slight.

Reference to Fig. 1 will show that the rotor constitutes an entirely unbalanced load at the extreme outer end of the shaft 12, thus producing a construction in which it is extremely difficult to prevent sagging or radial displacement of the rotor. To prevent this undesirable result I have provided an external support for the bearing 11, which I will now describe.

My improved external support preferably comprises a stand 20 adapted to be bolted or otherwise firmly secured to the base 13 between the pump and the motor. An annular member 21 is bolted to the stand 20 and is provided with an opening, through which the shaft 12 freely extends.

The inner face of the member 21 is provided with a circular boss 22, closely fitting within a cylindrical opening 23 in the outer end portion of the bearing 11. The member 21 may be secured to the end of the bearing 11 by screws or bolts 25 as indicated in Fig. 2. The parts are accurately formed so that the center of the annular boss or projection 22 is exactly in alignment with the bearing 11 and also with the center of the motor frame 14 when the external support is secured to the base 13.

With this construction, the bearing 11 is very firmly and accurately supported, quite closely adjacent to the rotor 15, and the possibility of radial displacement of the rotor is practically eliminated.

In Figs. 4 to 6, I have shown a substantially similar construction but I have provided a stand 30 for the external bearing support which is of a somewhat different outline, and I have formed the supporting member 31 as an integral part of the bearing bracket 32 in which the bearing 33 is mounted.

The operation with this form of my invention is substantially the same as with that already described, but the construction is somewhat more economical and satisfactory when the support can be formed as an integral part of the bearing bracket. The construction shown in Figs. 1 to 3, however, is better adapted for application to commercial pumps which are already constructed.

In Fig. 6, I have shown oil-retaining and dust-excluding cover plates 34 and 35. Reference to Fig. 3 will indicate that the supporting member 21 is simply substituted for the outer oil-retaining and dust-excluding plate in the regular bearing construction of the pump and motor unit.

In Figs. 7 and 8, I have shown a further modification in which supporting members 40 are secured to the base 13 and to the overhanging portion of the pump casing by which the bearing 42 is supported. This provides a support for the bearing at a point substantially nearer the unbalanced weight of the rotor than is provided by the regular base of the pump casing.

With all forms of my invention the rotor is held accurately centered in the stationary motor frame and the danger of rubbing contact and loss of power by radial displacement of the rotor is effectively prevented, a result of much importance in the large pumping units for which my improvements are designed.

I have shown my improvements applied to an air pump of a commercial type but the invention is not to be limited thereto, as it is capable of more general application.

Having thus described my invention and the advantages thereof, I do not wish to be limited to the details herein disclosed otherwise than as set forth in the claims, but what I claim is:—

1. A motor-driven rotary pumping unit comprising a pump casing, a main pump shaft mounted in bearings at each side of said casing and having one end portion projecting outwardly to receive the unsupported rotor of a driving motor, and an external support firmly secured to the shaft bearing on the motor side of the pump casing, said pump and support being mounted upon a common base and said support having an upper portion provided with a circular flange on one face extending into and closely fitting a cylindrical recess at the outer end of the shaft bearing.

2. In a motor-driven rotary pumping unit, a base, a pump having a casing and a driving motor having a casing, said two casings being mounted in spaced relation on said base, a main pump shaft mounted in bearings at each side of said pump casing and having one end portion projecting outwardly to receive the unsupported rotor of said driving motor, and an external support for the shaft bearing on the motor side of the pump casing, said external support being fixed on said base between said casings and firmly engaging and supporting the said shaft bearing from radial displacement.

3. In a motor-driven rotary pumping unit, a base, a pump having a casing and a driving motor having a casing, said two casings being mounted in spaced relation on said base, a main pump shaft mounted in bearings at each side of said pump casing and having one end portion projecting outwardly to receive the unsupported rotor of said driving motor, and a supporting member effective to prevent downward displacement of said rotor in said motor frame, said member being secured to said base between said pump and motor casings and being connected at its upper end to firmly support the shaft bearing on the motor side of the pump casing.

4. A motor driven pumping unit comprising a pump casing, a main shaft mounted in bearings at each side of said casing, an electric motor for driving said shaft, said shaft having one end portion projecting outwardly to receive the unsupported rotor of said motor, and means between said motor and said casing, to support and center the unsupported rotor against radial displacement by magnetic and other pull thereon.

In testimony whereof I have hereunto affixed my signature.

IRVING C. JENNINGS.